United States Patent Office
3,453,144
Patented July 1, 1969

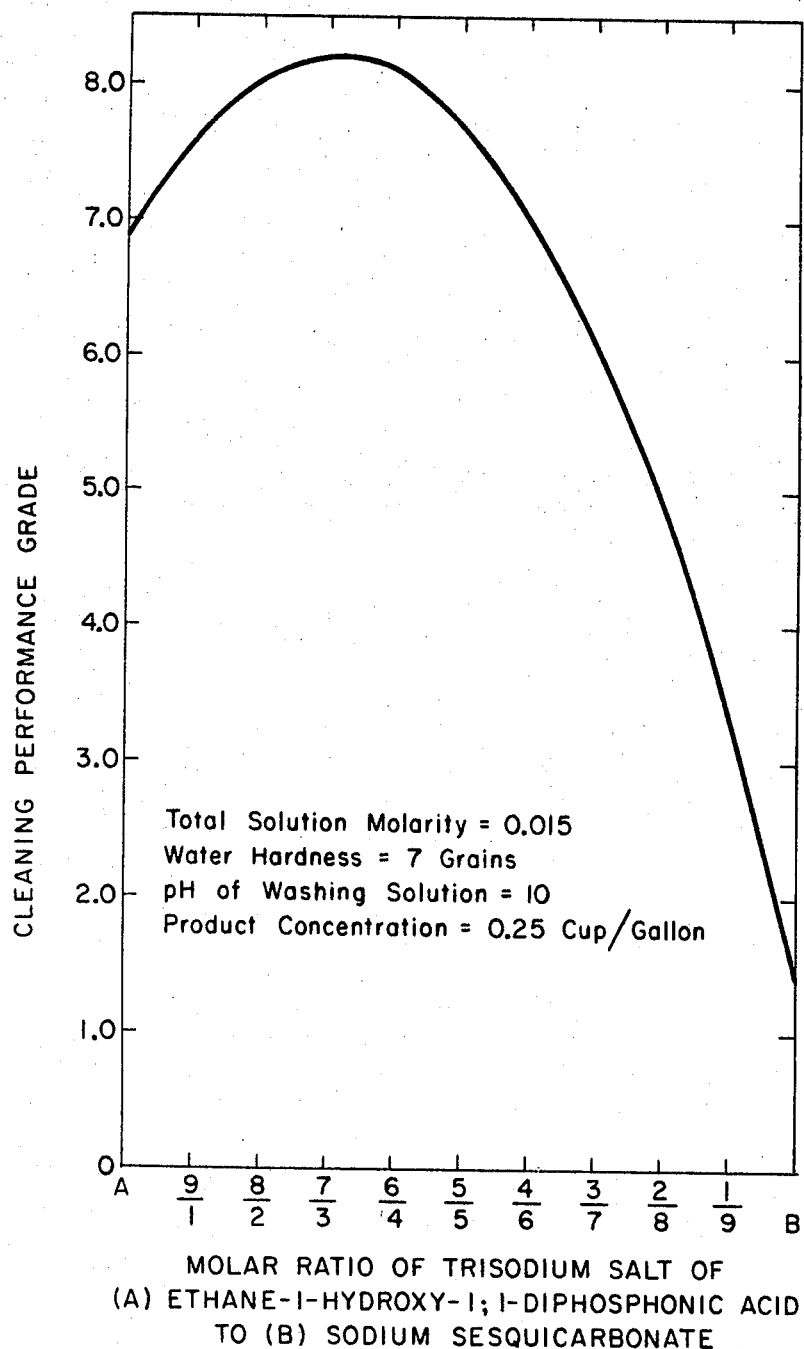

3,453,144
LIQUID CLEANER COMPOSITION
Frank Morgan, Cincinnati, and Alan Frank Walden, Springfield Township, Ohio, assignors to The Procter & Gamble Company, Cincinnati, Ohio, a corporation of Ohio
Filed Feb. 12, 1965, Ser. No. 432,080
Int. Cl. B08b 3/08
U.S. Cl. 134—26                                    9 Claims

ABSTRACT OF THE DISCLOSURE

A liquid cleaner composition for hard surfaces which contains 3–47% of a water-soluble salt of ethane-1-hydroxy-1,1-diphosphonic acid and 1–37% of a water-soluble inorganic alkaline non-sequestering buffering ingredient capable of maintaining a pH of from about 9 to about 11 in an aqueous solution selected from sodium or potassium sesquicarbonate, tetraborate and orthophosphate salts or mixtures thereof, the combined materials being present in aqueous solution in an amount of at least 12% by weight.

This invention relates to a hard-surface liquid cleaner composition and more especially to a multi-purpose liquid cleaner composition which embodies synergistic performance properties of the essential ingredients.

In order for a product to be useful as a multi-purpose cleaning composition in household environmental situations, it must be effective against different soiling conditions such as air-borne particulate soils, fatty, oily soils, hand smudges, scuff marks, etc. Kitchen surfaces, for example, are especially exposed to cooking oils and greases in addition to air-borne particulate soils; this soiling combination represents a relatively difficult cleaning situation. Any composition found useful as a household cleaner can, of course, also be applied to many other institutional and industrial situations.

An important consideration in formulating a cleaner composition, whether it has the physical form of a solid or liquid, for general household, industrial and institutional applications, such as floors and walls, is the safety factor, i.e., it must be safe to use and mild to human skin. Household applications generally involve hand washing procedures, and mildness is therefore an important factor.

A primary object of the present invention is to provide a liquid cleaner composition useful for washing hard surfaces such as walls, floors, linoleum, tiles, etc. Another object of the present invention is to provide a liquid cleaner composition which embodies synergistic performance properties of the essential ingredients and which is especially effective at cleaning hard surfaces which are soiled with a combination of oily and greasy soil and air-borne particulate soil; a situation, for example, commonly found in the kitchen. Moreover, it is another object to provide an improved general all-purpose household liquid cleaner composition having synergistic cleaning performance characteristics when diluted with water. These and other objects will become apparent from a careful reading of the following description of the present invention.

The drawing is a graph illustrating the synergistic hard-surface performance results obtained by using the composition of the present invention.

It has now been discovered that the preceding objects can be obtained by preparing a liquid cleaner composition consisting essentially of a synergistic mixture of:

(1) From about 3% to about 47% by weight of a water-soluble salt of ethane-1-hydroxy-1,1-diphosphonic acid.

(2) From about 1% to about 37% by weight of a water-soluble inorganic alkaline non-sequestering buffering ingredient which is capable of maintaining a pH of from about 9 to about 11 in an aqueous solution, and (3) The balance being water.

The combined percentage of said synergistic mixture being greater than about 12% by weight of said composition, and the molar ratio of said water-soluble salt of ethane-1-hydroxy-1,1-diphosphonic acid to said inorganic non-sequestering buffering ingredient being within the range of from about 20:1 to about 3:5 and preferably within a ratio of from about 9:1 to about 5:6.

A preferred embodiment of the present invention is a liquid composition consisting essentially of water and a synergistic mixture of from 5% to 38% by weight of a water-soluble salt of ethane-1-hydroxy-1,1-diphosphonic acid, and from 2% to 27% by weight of said inorganic alkaline non-sequestering buffering ingredient wherein said synergistic mixture embodies the ingredients within the above specified molar ratios.

Ethane-1-hydroxy-1,1-diphosphonic acid,

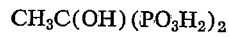

$$CH_3C(OH)(PO_3H_2)_2$$

is a known composition of matter having recognized sequestering properties. It is referred to and described, for example, in such prior art references as Beilstein, Handbuch der Organischem Chemie, 4 ed., vol. 2, p. 171, and British Patents 927,617, 889,670, 925,373, and 903,816. This compound will be referred to hereinafter as EHDP. Any alkali metal, e.g. sodium, potassium, and the like, ammonium or substituted ammonium salt form can be used in the practice of the present invention, but the sodium and potassium compounds are the preferred salt forms and especially as the tri-sodium or tri-potassium salts.

The inorganic alkaline non-sequestering buffering compounds which, according to the present invention, interact synergistically with the water-soluble salts of ethane-1-hydroxy-1,1-diphosphonic acid, in critical molar proportions, are those which provide a pH of from about 9 to about 11 in aqueous solution. Examples of such inorganic alkaline non-sequestering buffering agents are sodium sesquicarbonate, sodium tetraborate, sodium orthophosphate, the corresponding potassium salts and mixtures of these materials. Sodium sesquicarbonate in combination with tri-sodium ethane-1-hydroxy-1,1-diphosphonate represents a preferred embodiment of the present invention.

The hard-surface liquid cleaner composition must contain at least 12% by weight of the synergistic mixture in order to provide a satisfactory cleaning result when the product is used as recommended. This level represents a minimum limit for acceptable performance. A cleaner composition formulated with less than 12% of the essential ingredients does not contain enough of each of the essential ingredients to facilitate the synergistic behaviour which forms the basis of the present invention. So far as an upper limit of said mixture is concerned, it is set primarily by practical formulating aspects such as the solubility of materials. Generally, it has been discovered that it is difficult to get into solution more than about 50% by weight of the synergistic mixture of ethane-1-hydroxy-1,1-diphosphonate and the inorganic alkaline non-sequestering buffering agent without using solubilizing additives. The practical problem at this level is one of getting the synergistic mixture into solution especially when other ingredients are also to be used as detergents, hydrotropes, and other minor additives which are usually added to improve the final consumer appeal of the product such as coloring additives, perfumes, etc. It is preferred to incorporate the synergistic compositions described herein into a complete formulation at a level of from about 16% to about 40% of the synergistic mixture by weight of the total novel hard-surface cleaner composition.

This is especially so when it is desired to have a detergent ingredient also present in the complete formulation. In its most simplified embodiment, the present invention consists essentially of a hard-surface liquid cleaner containing from about 12% to about 50% by weight, preferably from 16% to 40%, of a critically proportioned synergistic mixture of said water-soluble salt of ethane-1-hydroxy-1,1-diphosphonate and an inorganic water-soluble alkaline non-sequestering buffering ingredient and from about 50% to about 88% water.

Organic detergent substances can be used in the present invention, if desired, in conjunction with the synergistic mixtures described herein. Such compounds are especially useful in formulating complete compositions. The group of compounds presented below are illustrative and representative of the several detergent classes which can be used. It is intended that others within each group can also be used in the compositions of the present invention.

As noted above, complete formulations embodying the synergistic mixtures described herein can include an organic detergent compound selected from the group consisting of anionic, nonionic, ampholytic and zwitterionic detergent compounds. Mixtures of such compounds can be used, at times, to great advantage.

(a) Anionic soap and non-soap synthetic detergents: Examples of suitable soaps are the sodium, potassium and alkylolammonium salts of higher fatty acids containing from about 10 to about 20 carbon atoms. Particularly useful and preferred are the sodium and potassium salts of the mixtures of fatty acids derived from coconut oil and tallow, i.e., sodium or potassium tallow and coconut soap. Anionic synthetic non-soap detergents can be broadly described as the water-soluble salts, particularly, the alkali metal salts, of organic sulfuric reaction products having in their molecular structure an alkyl radical containing from about 8 to about 22 carbon atoms and a radical selected from the group consisting of sulfonic acid and sulfuric acid ester radicals. (Included in the term "alkyl" is the alkyl portion of higher acyl radicals.) Important examples of the synthetic detergents which form a part of the preferred compositions of the present invention are the sodium or potassium alkyl sulfates, especially those obtained by sulfating the higher alcohols ($C_8$–$C_{18}$ carbon atoms) produced by reducing the glycerides of tallow or coconut oil; sodium or potassium alkyl benzene sulfonates, in which the alkyl group can be branched chain or straight chain and contains from about 9 to about 18 carbon atoms; sodium alkyl glyceryl ether sulfonates, especially those ethers of the higher alcohols derived from tallow and coconut oil; sodium coconut oil fatty acid monoglyceride sulfates and sulfonates; sodium or potassium salts of sulfuric acid esters of the reaction product of one mole of a higher fatty alcohol (e.g. tallow or coconut oil alcohols) and about 1 to 6 moles of ethylene oxide; sodium or potassium salts of alkyl phenol ethylene oxide ether sulfate with about 1 to about 10 units of ethylene oxide per molecule and in which the alkyl radicals contain about 8 to 12 carbon atoms; the reaction product of fatty acids esterified with isethionic acid and neutralized with sodium hydroxide where, for example, the fatty acids are derived from coconut oil; sodium or potassium salts of fatty acid amide of a methyl tauride in which the fatty acids, for example, are derived from coconut oil; and others known in the art, a number being specifically set forth in United States Letters Patent Nos. 2,486,921, 2,586,922, and 2,396,278.

(b) Nonionic synthetic detergents broadly described as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

A well known class of such nonionic synthetic detergents is made available on the market under the trade name of "Pluronic." These compounds are formed by condensing ethylene oxide with an hydrophobic base formed by the condensation of propylene oxide with propylene glycol. The hydrophobic portion of the molecule which exhibits water insolubility, has a molecular weight of from about 1500 to 1800. The addition of polyoxyethylene radicals to this hydrophobic portion tends to increase the water solubility of the molecule as a whole and the liquid character of the product is retained up to the point where polyoxyethylene content is about 50% of the total weight of the condensation product.

Other suitable nonionic synthetic detergents include:

(1) The polyethylene oxide condensates of alkyl phenols, e.g., the condensation products of alkyl phenols having an alkyl group containing from about 6 to 12 carbon atoms in either a straight chain or branched chain configuration, with ethylene oxide, the said ethylene oxide being present in amounts equal to 5 to 25 moles of ethylene oxide per mole of alkyl phenol. The alkyl substituent in such compounds may be derived from polymerised propylene, diisobutylene, octene, or nonene, for example.

(2) Those derived from the condensation of ethylene oxide with the product resulting from the reaction of propylene oxide and ethylene diamine. For example, compounds containing from about 40% to about 80% polyoxyethylene by weight and having a molecular weight of from about 5,000 to about 11,000 resulting from the reaction of ethylene oxide groups with a hydrophobic base constituted of the reaction product of ethylene diamine and excess propylene oxide, said base having a molecular weight of the order of 2,500 to 3,000 are satisfactory.

(3) The condensation product of aliphatic alcohols having from 8 to 22 carbons atoms, in either straight chain or branched chain configuration, with ethylene oxide, e.g., a coconut alcohol-ethylene oxide condensate having from 5 to 30 moles of ethylene oxide per mole of coconut alcohol, the coconut alcohol fraction having from 10 to 14 carbon atoms.

(4) Long chain tertiary amine oxides corresponding to the following general formula, $R_1R_2R_3N \rightarrow O$, wherein $R_1$ is an alkyl or haloalkyl radical of from about 8 to about 18 carbon atoms, and $R_2$ and $R_3$ are lower alkyl radicals such as methyl, ethyl or N-propyl radicals. The arrow in the formula is a conventional representation of a semi-polar bond. Examples of amine oxides suitable for use in this invention include dimethyldodecylamine oxide, dimethyloctylamine oxide, dimethyldecylamine oxide, dimethyltetradecylamine oxide, dimethylhexadecylamine oxide, and perfluorinated straight chain alkyl amine oxide compounds such as N,N-dimethyl-1,1-dihydrogen perfluordecylamine oxide.

(5) Long chain tertiary phosphine oxides corresponding to the following general formula $RR'R''P \rightarrow O$ wherein R is an alkyl, alkenyl or monohydroxyalkyl radical ranging from 10 to 18 carbon atoms in chain length and R' and R'' are each lower alkyl or monohydroxyalkyl groups containing from 1 to 3 carbon atoms. The arrow in the formula is a conventional representation of a semi-polar bond. Examples of suitable phosphine oxides are: dodecyldimethylphosphine oxide, tetradecyldimethylphosphine oxide, tetradecylmethylethylphosphine oxide, cetyldimethylphosphine oxide, stearyldimethylphosphine oxide, cetylethylpropylphosphine oxide, dodecyldiethylphosphine oxide, tetradecyldiethylphosphine oxide, dodecyldipropylphosphine oxide, dodecyldi(hydroxymethyl)phosphine oxide, dodecyldi(2-hydroxyethyl)phosphine oxide, oleyldimethylphosphine oxide, and 2-hydroxydodecyldimethylphosphine oxide.

(6) Long chain fatty acid amides corresponding to the following formula

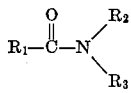

wherein $R_1$ is an alkyl radical containing from about 8 to about 18 carbon atoms, and $R_2$ and $R_3$ are each ethanol radicals. Examples of amides suitable for use in this invention include lauric diethanolamide, capric diethanolamide, myristic diethanolamide, etc.

(c) Ampholytic synthetic detergents can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Examples of compounds falling within this definition are sodium - 3-dodecylaminopropionate and sodium-3-dodecylaminopropane sulfonate.

(d) Zwitterionic synthetic detergents can be broadly described as derivatives of aliphatic quaternary ammonium, phosphonium, and sulfonium compounds, in which the aliphatic radical may be straight chain or branched, and wherein one of the aliphatic substituents contains from about 8 to 18 carbon atoms and one contains an anionic water solubilizing group, e.g., carboxy, sulfo, sulfato, phosphato, or phosphono. Examples of compounds falling within this definition are 3-(N,N-dimethyl-N-hexadecylammonio)propane - 1-sulfonate and 3-(N,N-dimethyl-N-hexadecylammonio)-2-hydroxy propane-1-sulfonate which are especially preferred for their excellent detergency characteristics.

The anionic, nonionic, ampholytic and zwitterionic detergent surfactants mentioned above can be used singly or in combination according to present invention. The above examples are merely specific illustrations of the numerous organic detergents within each class which can find application within the scope of this invention. When detergent compounds are employed in conjunction with the synergistic mixtures described above to formulate complete compositions, they can be present at a percentage of from 0% to about 20% by weight and preferably from about 3% to about 15% by weight of the total composition.

As mentioned above, the compositions of the present invention are in the form of liquid compositions. In this physical form, they offer the advantage of being highly concentrated solutions which offer the general advantage of convenience and ease of use. Concentrated liquid cleaner compositions have certain advantages and aesthetic appeal over granular or powdered detergent compositions. Among these advantages are freedom from dustiness and ease of dispensing. Moreover, another advantage is that a liquid product can be used in its highly concentrated form as a general all-purpose spot remover for hand smudges from walls, heel and sole soiled marks on floors, and the like. Powdered products do not lend themselves to such use as readily as liquids.

The liquid detergent product can be prepared in any suitable manner. For example, ethane-1-hydroxy-1,1-diphosphonic acid can be added to the appropriate amount of water in an agitated vessel and neutralized to about pH 10 with alkali such as sodium or potassium hydroxide, or with an appropriate mixture thereof. Neutralizing to a pH of about 10 results in the preparation of the trisodium or tripotassium salt, and this neutralized form represents a preferred embodiment of the present invention. The alkaline buffering salt can be added next, in crystalline form, and dissolved with agitation. A hydrotrope, as described below, usually in concentrated aqueous solution, can be added next if desired, followed by an organic detergent or a mixture of detergents, and any other additives, as desired. By proper selection of cation, hydrotrope type and level, and surfactant type and level, mixing temperatures, and degrees of agitation, a uniform, stable liquid cleaner results.

Usually it is necessary to include in the composition a small amount of a hydrotrope material as mentioned above. Such additives, when used, can be used at levels of up to about 10% by weight. A preferred range for the hydrotrope is from about 2% to about 8% by weight of the composition.

The hydrotrope material promotes the compatibility of the ingredients and assists in forming a homogeneous product. The amount of hydrotrope which can be employed varies considerably, depending in part upon the proportions of the other ingredients. The water-soluble hydrotrope substances which have been found to be particularly effective in the liquid detergent composition are the alkali metal lower alkylarylsulfonate salts, preferably sodium and potassium toluene and xylene sulfonate salts. Sulfonates made from xylene include orthoxylene sulfonate, metaxylene sulfonate, paraxylene sulfonate and ethylbenzene sulfonate. Commercial xylene sulfonates usually contain metaxylene sulfonate as the main ingredient. Analyses of typical commercial products show about 40%–50% metaxylene sulfonate, 10%–35% orthoxylene sulfonate, and 15%–30% paraxylene sulfonate with 0%–20% ethylbenzene sulfonate.

A complete liquid cleaner formulation according to the present invention, therefore, can have the general composition outlined in the table below. It is to be appreciated that the most important portion thereof is the synergistic mixture of the water-soluble salt of ethane-1-hydroxy-1,1-diphosphonate, the inorganic alkaline buffering agent and water.

TABLE

| Ingredients | Operable range, percent | Preferred range, percent |
| --- | --- | --- |
| (A) Water-soluble salt of ethane-1-hydroxy-1q,1-diphosphonate | [1] 3–47 | [2] 5–38 |
| (B) Inorganic alkaline non-sequestering ingredient | [1] 1–37 | [2] 2–27 |
| Detergent ingredient | 0–20 | 3–15 |
| Hydrotrope | 0–10 | 2–8 |
| Water and miscellaneous, balance to | 100 | 100 |

[1] Combined total 12–50%; molar ratio of A:B=20:1–3:5.
[2] Combined total 16–40%; molar ratio of A:B=9:1–5:6.

The unexpected synergistic cleaning properties of the compositions of the present invention were discovered by the following general procedure.

Soiled test surfaces designed to represent heavily soiled kitchen walls were prepared as follows: Metal test panels were primed and painted with two coats of semi-gloss enamel. The painted surfaces were allowed to dry completely and then a standardized artificial soil containing both fatty and particulate materials was applied to the painted surfaces. The soil was applied evenly to each of the test panels in equal and standardized amounts. The soiling conditions were intentionally made fairly severe to represent a challenge to the cleaning ability of the compositions of the present invention. The soiled panels were then conditioned and seasoned for several weeks to allow the soil to dry and adhere firmly to the painted surface.

These solid panels were thereafter washed with a Gardner Washability Machine and the washing solutions prepared in accordance with the present invention. The Gardner Washability Machine is manufactured by Gardner Laboratory, Inc., Bethesda, Md., and was designed for measuring the washability of various surfaces such as paints, varnishes, and the like. Very briefly, the operation of the washing machine involves a sponge impregnated with cleaning solution being oscillated over the treated surfaces at a set rate of speed and pressure.

The compositions being tested were prepared into washing solutions having a total molarity of .015, a pH of 10 and containing 7 grains per gallon of hardness minerals.

After cleaning, the test panels were graded on a scale of 0 to 10. On this scale, panels washed with water alone, without any cleaner composition added, score a grade of zero. EHDP, in this case the trisodium salt, and sodium sesquicarbonate were each tested separately at a solution molarity of .015, and then different molar mixtures of these two compounds were tested in which the total solution molarity was constant at .015. These two compounds were selected as being representative of the claimed classes of compounds. EHDP when tested alone scored a grade of about 6.9, and sodium sesquicarbonate was graded about 1.5.

It will be seen from the drawing that as the EHDP was replaced with increasing molar increments of sodium sesquicarbonate, the performance grades markedly improved until at about a 2:1 molar ratio of EHDP to sodium sesquicarbonate, a peak grade of about 8.2 was achieved. Thereafter, the performance level still exceeded that of EHDP alone until a molar ratio of about 3:5 was reached. Based on these performance results, the preferred molar ratio of EHDP to sodium sesquicarbonate is within the range of from 9:1 to 5:6.

Similar relative levels of synergistic improvement can be achieved when the sodium sesquicarbonate is replaced by sodium tetraborate or sodium orthophosphate on a molar basis. In fact, excellent results can be obtained when the inorganic alkaline non-sequestering buffering component consists of binary and ternary mixtures of sesquicarbonate, tetraborate, and orthophosphate salts such as are illustrated below for example in Examples II, IV and XI. When ternary mixtures of the non-sequestering buffering agents are used, it is preferred to use them at equimolar equivalents as exemplified in Example XI.

The product concentration in the tests depicted in the drawing was one-fourth cup per gallon of washing solution. This represents the preferred recommended usage level. A product concentration varying from about one-eighth cup per gallon to about three-eighths cup per gallon offers excellent results in most usage situations.

The composition of the present invention also can be used satisfactorily full strength as a cleaner for small soiled areas or as a spot remover for hand smudges on walls and ceilings, as well as scuff marks on floors.

The following examples are illustrative of the present invention, but it will be understood that the invention is not in any way limited thereto.

Example I

| | Percent |
|---|---|
| Tripotassium salt of ethane-1-hydroxy-1,1-diphosphonic acid | 16.0 |
| Sodium sesquicarbonate | 8.0 |
| Water | 76.0 |

This composition is a non-sudsing liquid cleaner which, when used at a recommended usage level of ¼ cup per gallon of water, provides a pH in the range of from about 9.5 to about 10.5 and offers excellent cleaning performance results.

Example II

| | Percent |
|---|---|
| Trisodium salt of ethane-1-hydroxy-1,1-diphosphonic acid | 12.0 |
| Sodium tetraborate | 2.0 |
| Trisodium phosphate dodecahydrate | 1.0 |
| Disodium phosphate, anhydrous | 0.4 |
| Water | 84.6 |

This composition is also a non-sudsing liquid cleaner which at recommended usage levels of ¼ cup per gallon offers cleaning performance equal or superior to ordinary sudsing liquid cleaners. The composition provides a washing solution having a pH of about 10.

Example III

| | Percent |
|---|---|
| Tripotassium salt of ethane-1-hydroxy-1,1-diphosphonic acid | 20.0 |
| Sodium sesquicarbonate | 1.0 |
| Dodecyl dimethyl phosphine oxide | 3.0 |
| Potassium toluene sulfonate | 6.0 |
| Water | 70.0 |

This composition is a sudsing liquid cleaner which provides excellent performance results on hard surfaces such as walls, floors, ceilings and the like.

Example IV

| | Percent |
|---|---|
| Tripotassium salt of ethane-1-hydroxy-1,1-diphosphonic acid | 4.7 |
| Trisodium phosphate dodecahydrate | 3.1 |
| Disodium phosphate, anhydrous | 1.2 |
| Sodium tetraborate | 3.1 |
| Potassium toluene sulfonate | 6.0 |
| Dimethyl dodecyl amine oxide | 3.0 |
| Water | 78.9 |

This composition is an economical liquid cleaner offering excellent preformance when used at a recommended usage level of ¼ cup per gallon of water. In such a washing solution the composition has a pH in the range of about 9.0 to 11.

Example V

| | Percent |
|---|---|
| Tripotassium salt of ethane-1-hydroxy-1,1-diphosphonic acid | 20.0 |
| Sodium sesquicarbonate | 1.6 |
| Potassium linear dodecyl benzene sulfonate | 2.5 |
| Potassium oleate | 2.5 |
| Sodium xylene sulfonate | 5.0 |
| Water | 68.4 |

This composition is a controlled sudsing liquid cleaner which provides superior cleaning performance at recommended usage levels in the range of ⅛ cup per gallon to about ⅜ cup per gallon of water. The washing solution has a pH in the range of 9 to 11.

Example VI

| | Percent |
|---|---|
| Tripotassium salt of ethane-1-hydroxy-1,1-diphosphonic acid | 10.0 |
| Sodium sesquicarbonate | 8.5 |
| Potassium toluene sulfonate | 6.0 |
| Dimethyl dodecyl amine oxide | 1.5 |
| Sodium alkyl ethoxy sulfate in which the alkyl chain contains about 12 carbon atoms and in which there are an average of approximately 3 moles ethylene oxide per mole of sulfate | 1.0 |
| Sodium alkyl glyceryl ether sulfonate in which the alkyl chain is derived from coconut oil | 0.5 |
| Water | 72.5 |

This composition is a medium sudsing liquid cleaner having a pH of about 10 and which gives superior performance characteristics when used according to recommended usage of ¼ cup per gallon.

Example VII

| | Percent |
|---|---|
| Tripotassium salt of ethane-1-hydroxy-1,1-diphosphonic acid | 15.0 |
| Sodium sesquicarbonate | 5.0 |
| 3-(N,N-dimethyl-N-dodecyl ammonio)-2-hydroxy propane-1-sulfonate | 1.5 |
| Sodium dodecyl ethoxy sulfate | 1.5 |
| Sodium xylene sulfonate | 6.0 |
| Water | 71.0 |

This is a sudsing liquid cleaner composition with superior performance properties when used at a recommended usage of ¼ cup per gallon in an aqueous solution having a pH in the range of 9 to 11.

Example VIII

| | Percent |
|---|---|
| Dipotassium monosodium salt of ethane-1-hydroxy-1,1-diphosphonic acid | 15.0 |
| Sodium sesquicarbonate | 5.0 |
| Poly oxyethylene condensate of nonyl phenol, about 9 moles ethylene oxide per mole nonly phonel | 3.0 |
| Potassium toluene sulfonate | 6.0 |
| Water | 71.0 |

This is a low sudsing liquid cleaner providing superior performance at recommended usage of ¼ cup per gallon of water having a pH of about 10.

Example IX

| | Percent |
|---|---|
| Disodium monopotassium salt of ethane-1-hydroxy-1,1-diphosphonic acid | 12.0 |
| Sodium sesquicarbonate | 10.0 |
| Lauric diethanol amide | 5.0 |
| Potassium toluene sulfonate | 9.0 |
| Water | 64.0 |

The foregoing is a sudsing liquid cleaner of superior performance. Recommended usage is ¼ cup per gallon of water. The washing solution has a pH of about 10.

Example X

| | Percent |
|---|---|
| Tripotassium salt of ethane-1-hydroxy-1,1-diphosphonic acid | 16.0 |
| Sodium sesquicarbonate | 8.0 |
| Sodium dodecyl benzene sulfonate (dodecyl being straight aliphatic radical) | 1.0 |
| Potassium toluene sulfonate | 2.0 |
| Water | 73.0 |

This is a sudsing liquid cleaner having superior cleaning performance properties. Recommended usage concentration is ¼ cup per gallon of water, thus providing a washing solution having a pH in the range of 9 to 11.

Example XI

| | Percent |
|---|---|
| Tripotassium salt of ethane-1-hydroxy-1,1-disphosphonic acid | 12.0 |
| Sodium sesquicarbonate | 4.0 |
| Sodium tetraborate | 6.7 |
| Trisodium orthophosphate | 3.3 |
| Disodium orthophosphate | 1.2 |
| Sodium coconut alkyl sulfate | 2.5 |
| Potassium toluene sulfonate | 6.0 |
| Water | 64.3 |

This is a sudsing liquid cleaner having superior performance when used as recommended in a solution having a pH of about 10.

Example XII

| | Percent |
|---|---|
| Tripotassium salt of ethane-1-hydroxy-1,1-diphosphonic acid | 12.0 |
| Sodium sesquicarbonate | 12.0 |
| 3-(N,N-dimethyl-N-dodecyl-ammonio) propane-1-sulfonate | 3.0 |
| Potassium toluene sulfonate | 6.0 |
| Water | 67.0 |

This is a sudsing liquid cleaner having superior performance properties. Recommended usage level is ¼ cup per gallon, also in an aqueous solution having a pH of about 10.

Example XIII

| | Percent |
|---|---|
| Tripotassium salt of ethane-1-hydroxy-1,1-diphosphonic acid | 12.0 |
| Sodium sesquicarbonate | 12.0 |
| Lauric diethanol amide | 5.0 |
| Potassium toluene sulfonate | 9.0 |
| Water | 62.0 |

This is a sudsing liquid cleaner of superior performance; recommended usage is ¼ cup per gallon, and the pH of the washing solution is preferably in the range of 9 to 11.

Various miscellaneous ingredients can be added to the compositions described herein to improve product appeal and performance and general consumer acceptance. For example, there can be mentioned coloring agents or dyes, opacifiers, perfumes, inorganic salts, insecticides and germicides and general antiseptic agents, abrasive materials such as finely divided silica, feldspar, pumice, keiselguhr, emery, Carborundum, and the like. When cleaning aids such as the aforementioned abrasive materials are incorporated into the compositions of the present invention, it is preferable to also add thickening agents or viscosity builders in order to help suspend said abrasive materials and thus provide a fairly homogeneous solution. Thickening agents which can be used in formulating an abrasive-type hard-surface liquid cleaner composition according to the present invention are fatty acid alkylolamides such as lauric diethanolamide amide, coconut oil diethanolamide and the corresponding monoethanolamides; glycerine, waxes, carboxymethylcellulose, and equivalent functional materials. Preferred thickening agents, or gelling agent, or viscosity builders, as they are sometimes called, are the fatty acid alkylolamides. For example, there can be used a fatty acid mono- or diethanolamide, as well as isopropanololamides, the glycerolamides and the tris(hydroxymethyl)-methyl amides. Preferred, however, is a mono- or diethanolamide of a fatty acid having from 8 to 18 carbon atoms in the molecule, especially lauric acid or a mixture of acids rich in lauric acid such as is obtained from oils such as palm kernel oil and coconut oil.

The aforementioned thickening agents are especially found useful when there is prepared according to the present invention a liquid cleaner composition consisting of the synergistic mixture of EHDP and an inorganic alkaline non-sesquestering buffering agent in the critical weight percentage and molar ratios, a soap detergent and an abrasive ingredient.

The following example embodies this aspect of the present invention.

Example XIV

| | Percent |
|---|---|
| Tripotassium ethane-1-hydroxy-1,1-diphosphonate | 16.0 |
| Sodium sesquicarbonate | 8.0 |
| Silica | 10.0 |
| Potassium tallow: coconut soap (80:20) | 7.0 |
| Coconut diethanolamide | 7.0 |
| Water | 52.0 |

In a liquid cleaner product as exemplified in Example XIV, the abrasive material can be present in a range of from about 4% to about 25% by weight, the amide can range from about 1% to about 10% by weight, and the soap ingredient can be present in an amount up to about 20% by weight, the balance in any event being water. The soap can be replaced in part or completely with any of the other detergent compounds mentioned above.

Although the present invention has been described and illustrated with reference to specific examples, it is understood that modifications and variations of the liquid hard-surface cleaner composition are contemplated within the scope of the appended claims.

What is claimed is:

1. A liquid cleaner composition consisting essentially of a synergistic mixture of from about 3% to about 47% by weight of a water-soluble trialkali metal salt of ethane-1-hydroxy-1,1-diphosphonic acid and from about 1% to about 37% by weight of a water-soluble inorganic alkaline non-sequestering sodium sesquicarbonate buffering ingredient which is capable of maintaining a pH of from about 9 to about 11 in an aqueous solution, and the balance being water, the combined percentage of said synergistic mixture being from about 12% to about 50% by weight of the composition, the molar ratio of said water-soluble trialkali metal salt of ethane-1-hydroxy-1,1-diphosphonic acid to said water-soluble inorganic alkaline non-sequestering sodium sesquicarbonate buffering ingredient being within a range of from about 9:1 to about 5:6.

2. A liquid cleaner composition of claim 1 wherein said synergistic mixture contains from 5% to 38% of said water-soluble trialkali metal salt of ethane-1-hydroxy-1,1-diphosphonic acid and from 2% to 27% of said water-soluble inorganic alkaline non-sequestering sodium sesquicarbonate buffering agent, and the balance is water.

3. A liquid cleaner composition of claim 1 wherein the water-soluble trialkali metal salt of ethane-1-hydroxy-1,1-diphosphonic acid is selected from the group consisting of the trisodium salt and the tripotassium salt.

4. A liquid cleaner composition of claim 1 which also contains from 0 to about 20% of an organic detergent surfactant selected from the group consisting of anionic, nonionic, ampholytic, zwitterionic detergent compounds, and mixtures thereof, and from 0 to about 10% of a hydrotrope material, said hydrotrope being an alkali metal lower alkylaryl-sulfonate salt.

5. A hard-surface liquid cleaner composition according to claim 1 wherein the synergistic mixture is present at from about 16% to about 40% by weight of the total composition.

6. A hard-surface liquid cleaner composition according to claim 5 wherein the organic detergent surfactant is present in an amount of from about 3% to about 15% by weight of the total composition.

7. A hard-surface abrasive liquid cleaner composition consisting essentially of from about 12% to about 50% by weight of a synergistic mixture of a water-soluble trialkali metal salt of ethane-1-hydroxy-1,1-diphosphonic acid and a water-soluble inorganic alkaline non-sequestering sodium sesquicarbonate buffering ingredient, the molar ratio of said water-soluble trialkali metal salt of ethane-1-hydroxy-1,1-diphosphonic acid to said water-soluble inorganic alkaline non-sequestering sodium sesquicarbonate buffering ingredient being with a range of from about 9:1 to about 5:6, from about 4% to about 25% by weight of an abrasive material selected from the group consisting of silica, feldspar, pumice, kieselguhr, emery and Carborundum, from about 1% to about 10% by weight of a thickening agent selected from the group consisting of fatty acid alkylolamides, glycerine, waxes and carboxymethylcellulose, from about 0% to about 20% by weight of soap, and the balance being water.

8. A hard-surface abrasive liquid cleaner composition consisting essentially of 16% tripotassium ethane-1-hydroxy-1,1-diphosphonate, 8% sodium sesquicarbonate, 10% silica, 7% potassium tallow:coconut soap, 7% coconut diethanolamide and 52% water.

9. A process for washing soiled household hard surfaces including walls and floors, which consists essentially of preparing a washing solution of an aqueous solution of the liquid composition of claim 1 having a concentration of said composition of from about ⅛ to about ⅜ cup per gallon, applying said washing solution to said soiled surfaces, oscillating said washing solution over said soiled surfaces and rinsing said solution from said surfaces.

References Cited
UNITED STATES PATENTS 3,159,581  12/1964  Diehl _____ 252—161
3,149,078  9/1964  Zmoda _____ 252—138

FOREIGN PATENTS 945,333  12/1963  Great Britain.

LEON D. ROSDAL, *Primary Examiner.*

B. BETTIS, *Assistant Examiner.*

U.S. Cl. X.R.

252—138, 113, 140, 116, 121, 131; 134—34, 42, 6